March 6, 1951 L. MAGNESI 2,544,234
ANT TRAP
Filed Feb. 19, 1948
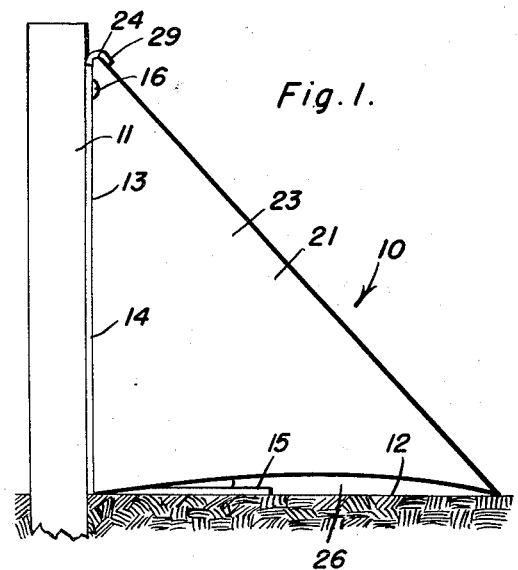
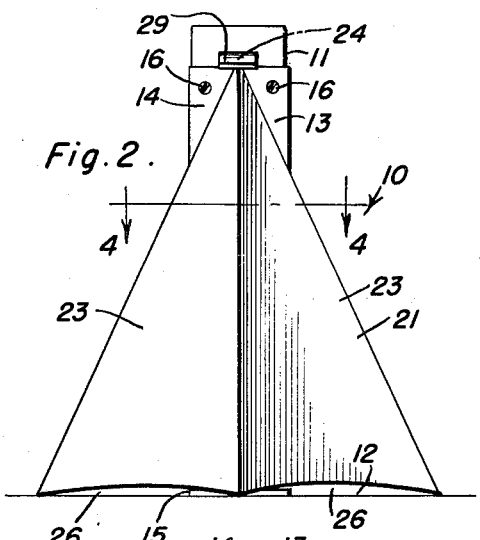
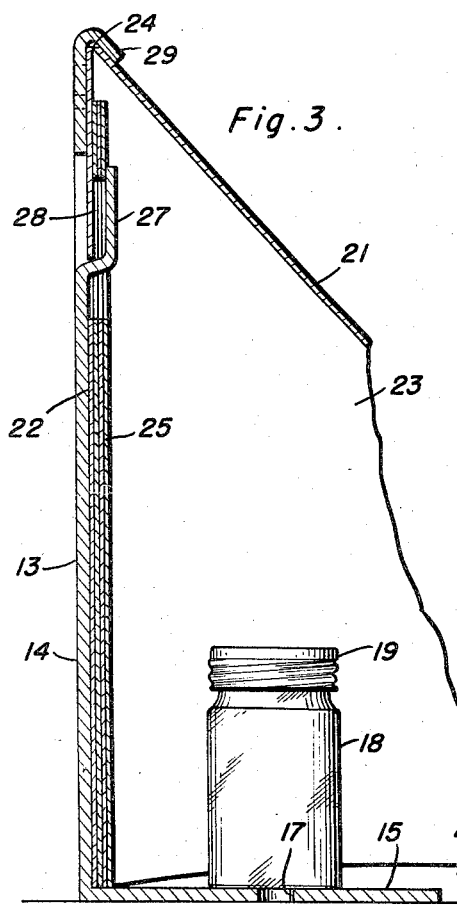
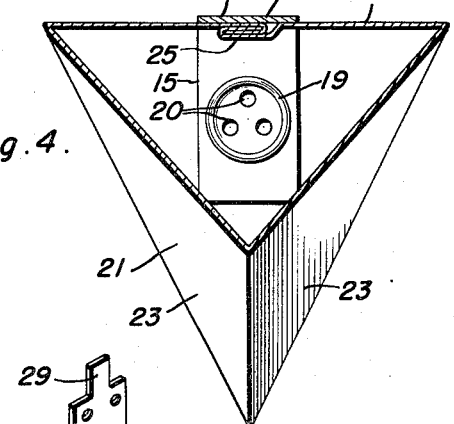
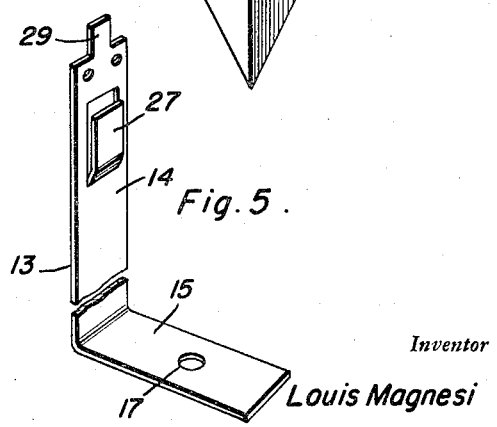
Inventor
Louis Magnesi
By Clarence A. O'Brien
and Harvey B. Jacobson
Attorneys Patented Mar. 6, 1951

2,544,234

UNITED STATES PATENT OFFICE 2,544,234

ANT TRAP

Louis Magnesi, Walnut Creek, Calif.

Application February 19, 1948, Serial No. 9,399

1 Claim. (Cl. 312—100)

This invention relates to new and useful improvements and structural refinements in ant traps, more specifically, ant traps which depend for their destroying ability upon a poisonous odoriferant, and the principal object of the invention is to increase the effectiveness of such traps by concentrating the fumes emanating from the odoriferant in the proximity of the trap itself.

This object is achieved by the provision of a hood over the odoriferant receptacle, so that diffusion of the poisonous fumes into the atmosphere will be substantially minimized.

Another feature of the invention resides in the provision of an ant trap which is simple in construction, which may be quickly and conveniently attended and inspected for proper functioning, and which will readily lend itself to economical manufacture.

With the above more important objects in view, and such other objects as may become apparent as this specification proceeds, the invention consists essentially of the arrangement and construction of parts as illustrated in the accompanying drawing, in which:

Figure 1 is a side elevational view of the invention;

Figure 2 is a front elevational view thereof;

Figure 3 is a fragmentary cross sectional view of the same;

Figure 4 is a cross-sectional view, taken substantially in the plane of the line 4—4 in Figure 2; and Figure 5 is a perspective view of a mounting plate used in the invention.

Like characters of reference are employed to designate like parts in the specification and throughout the several views.

Referring now to the accompanying drawing in detail, the invention consists of an ant trap designated generally by the reference character 10, the same embodying in its construction a stake 11 adapted at one end thereof for insertion in the ground 12, as will be readily apparent.

An L-shaped mounting plate 13 provides vertical and horizontal arms 14, 15 respectively, and the vertical arm 14 of the plate is secured adjacent its upper end to the stake 11, as indicated at 16. The horizontal arm 15 of the plate 13 is disposed on the ground 12, and if desired, this horizontal arm may be provided with an aperture 17 to receive a peg or spike, or the like (not shown), inserted in the ground for added rigidity.

A suitable receptacle 18 containing a poisonous odoriferant is positioned on the arm 15 of the plate 13, the receptacle 18 being equipped with a cover 19 provided with a plurality of openings 20, so that the fumes from the odoriferant may pass into the atmosphere to attract the ants.

The essence of novelty in the invention resides in the provision of a hood 21 under which the receptacle 18 is positioned, the hood 21 having an open base of a triangular configuration and including an upright triangular wall 22 and a pair of upwardly converging side walls 23, the walls 22, 23 terminating at their upper ends in a closed extremity or apex 24, as will be readily understood.

If desired, the hood 21 may be formed integrally from one piece of material, the edges of which may be connected together, preferably on the upright wall 22, by means of a seam 25, as is best shown in Figure 4.

The lower edges of the side walls 23 are relieved or arcuated so as to provide entrance openings 26, whereby ants may gain access to the interior of the hood 21 and to the receptacle 18.

It should be understood that while the purpose of the hood 21 is to prevent dispersion of the poisonous odoriferant into the atmosphere, a sufficient volume of fumes will escape to attract the ants into the trap, whereupon by confining or concentrating the fumes under the hood 21, the ants will become poisoned, particularly when coming in contact with the odoriferant material in the receptacle 18 through the medium of the openings 20.

Means are provided for securing the hood 21 to the stake 11, more specifically, to the mounting plate 13, said means including a laterally offset tongue 27 which is struck out from the vertical arm 14 of the plate and is adapted to be received in an opening 28 formed in the seamed portion 25 of the hood wall 22.

This tongue will prevent the hood to be drawn forwardly from the stake 11, unless the hood is first lifted upwardly which, in turn, is prevented by turning down a bendable detent 29 formed integrally with the plate arm 14. Needless to say, the lower edge of the hood wall 22 rests upon the horizontal wall 15 of the plate, as is best shown in Figure 3.

Finally, it should be pointed out that poisonous substances of various kinds, with or without odor, may be used in the receptacle 18, and although in the instance of non-odoriferous poisons, the hood 21 would not be required to prevent dispersion of fumes, the hood will, nevertheless, serve as a protector in preventing children or animals from coming in contact with the poison in the receptacle.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

In a device of the character described, the combination of an L-shaped supporting bracket affording a horizontal arm and a vertical arm, a removable hood positioned on said bracket and including a vertical rear wall placed against said vertical arm and resting with its lower edge on said horizontal arm, an upper portion of said wall being provided with a vertically extending slot, a keeper tongue struck out from an upper portion of said vertical arm, said tongue extending forwardly through said slot and then upwardly whereby an upper portion thereof is disposed against the front surface of said wall above said slot, and a bendable detent extending downwardly from the upper end of said vertical arm over the upper edge of said wall.

LOUIS MAGNESI.

REFERENCES CITED

The following references are of record in the file of this patent:

UNITED STATES PATENTS

| Number | Name | Date |
|---|---|---|
| 1,048,977 | Larkin | Dec. 31, 1912 |
| 1,499,305 | Lammers | June 24, 1924 |
| 1,572,568 | Smith et al. | Feb. 9, 1926 |
| 1,783,631 | Sladky | Dec. 2, 1930 |

FOREIGN PATENTS

| Number | Country | Date |
|---|---|---|
| 221,882 | Great Britain | Sept. 22, 1924 |